(12) United States Patent
van de Ven

(10) Patent No.: US 6,329,764 B1
(45) Date of Patent: Dec. 11, 2001

(54) METHOD AND APPARATUS TO IMPROVE THE COLOR RENDERING OF A SOLID STATE LIGHT SOURCE

(76) Inventor: Antony van de Ven, c/o 5$^{th}$ Floor, HKPC Bldg. 78 Tat Chee Ave., Kowloon (HK)

( * ) Notice: Subject to any disclaimer, the term of this patent is extended or adjusted under 35 U.S.C. 154(b) by 0 days.

(21) Appl. No.: 09/552,699

(22) Filed: Apr. 19, 2000

(51) Int. Cl.$^7$ .............................. G05B 37/02; G02F 1/03
(52) U.S. Cl. ..................... 315/291; 315/200 A; 315/360; 362/800
(58) Field of Search ................................ 315/200 A, 291, 315/219, 360, 362, 185 R, 185 S, 224; 362/800

(56) References Cited

U.S. PATENT DOCUMENTS

| | | | |
|---|---|---|---|
| 5,045,896 | 9/1991 | Ash et al. | 357/17 |
| 5,743,629 | 4/1998 | Helstern et al. | 362/293 |
| 5,783,909 | * 7/1998 | Hochstein | 315/224 |
| 6,016,038 | * 1/2000 | Mueller et al. | 315/291 |
| 6,028,694 | * 2/2000 | Schmidt | 362/119 |
| 6,095,661 | * 8/2000 | Lebens et al. | 315/291 |

* cited by examiner

*Primary Examiner*—Don Wong
*Assistant Examiner*—Wilson Lee
(74) *Attorney, Agent, or Firm*—Jacobson Holman, PLLC

(57) ABSTRACT

This invention relates to a method and apparatus for improving the color rendering of a lamp or light source. Specifically, a solid state light source such as an InGaN LED is driven by a modulated signal in which portions of the signal are provided with different forward currents within a single cycle. The different forward currents can provide a variation in the dominant wavelength emitted from the LED for each portion to provide a broader range of color produced by the LED. The pulses and cycle may be of sufficient frequency to provide an apparent constant light to the human eye without color change although the use of varying dominant wavelengths to provide the overall color can improve the LEDs color rendering. An improvement in such color rendering may be particularly important when the lamp or light source is used for illumination either on its own or in conjunction with other LEDs.

10 Claims, 8 Drawing Sheets

Dominant wavelength for blue
$\lambda_{dom} = f(I_F)$, $T_A = 25°C$

Dominant wavelength for true green
$\lambda_{dom} = f(I_F)$, $T_A = 25°C$

Dominant wavelength for verde
$\lambda_{dom} = f(I_F)$, $T_A = 25°C$

METHOD AND APPARATUS TO IMPROVE THE COLOR RENDERING OF A SOLID STATE LIGHT SOURCE

FIELD OF THE INVENTION

This invention relates to a method and apparatus to improve the colour rendering of a solid state light source and, in particular, solid state lamps or light sources such as LEDs.

BACKGROUND TO THE INVENTION

A number of different types of light sources ate used to provide general lighting. General lighting for offices, residences or similar has been provided by incandescent lighting or fluorescent light in the past. One of the reasons for favouring such light sources is the improved colour rendering that can be provided by light sources that produce light over a broad bandwidth.

Solid state lighting usually involves the use of LEDs hat, upon application of a relatively constant forward current, produce a relatively stable quantity of light at a particular dominant wavelength. Although such light sources have advantages in reliability and efficiency over other light sources such as incandescent lighting, they have generally been unable to provide the variety of wavelengths necessary to produce white light cost effectively.

To produce white light from LEDs, it is possible to combine two or more LEDs having different dominant wavelengths that complement each other to produce white light. However, the cost of each individual light source is increased with each additional different coloured LED provided. Although white light can be produced by as few as two complementary LEDs, such light will not produce good colour rendering as many of the wavelengths from the spectrum of light are missing or insufficiently provided to provide accurate colour rendering over a reasonable range.

Various attempts have been to produce white light from a single LED or to alter the wavelength of light generated from LED sources.

One category of solutions has sought to alter the wavelength of the light emitted by the lamp subsequent to its production by the LED through the use of surrounding apparatus. This may include the use of an LED to stimulate a phosphor-based colour conversion system as is described in U.S. Pat. No. 6,028,694 or the use of a surrounding reflector to alter the emitted wavelength as is described in U.S. Pat. No. 5,743,629. The difficulty with such methods is that it requires fair more expensive production or installation for the individual light sources as each LED or a small group of LEDs requires provision with additional items to produce the desired light, With the phosphor based solutions, the use of phosphor Creates extra variation in the light produced by each LED, A consistent colour between LEDs is difficult Another method to try and produce some variation in emitted wavelengths involved producing LEDs having a graded band gap active region that is graded between two materials of different centre wavelengths of light emission. Such an LED is disclosed in U.S. Pat. No. 5,045,896. However, the production of such LEDs is difficult to provide any accuracy in the emissions of the light source.

OBJECT OF THE INVENTION

It is an object of the present invention to provide a method and apparatus to improve the colour rendering of a solid state light source including at least one at LED to overcome some of the disadvantages of the prior art or at least provide the public with a useful choice.

In particular, it is an object of the present invention to reduce the need for extraneous items to alter the wavelength of light once emitted.

SUMMARY OF THE INVENTION

Accordingly, in the first aspect, the invention consists in a method for improving the colour rendering of a solid state light source comprising:

providing at least one LED;

providing a current including a modulated driving signal to said LED; and altering the forward current with the modulated driving signal to provide at least two dominant emitted wavelengths from said at least one LED.

Accordingly, in a second aspect, the invention may broadly be said to consist a solid state light source comprising:

at least one LED;

a current signal generator to generate a modulated driving signal to said LED; and said modulated driving signal including at least one portion at a higher current and at least one portion of said signal at a lower current within a cycle of said driving signal.

Preferably said driving signal comprises a pulse width modulated signal.

Preferably said at least one pulse of higher current is of shorter duration than said at least one pulse at said lower current.

BRIEF DESCRIPTION OF THE DRAWINGS

Preferred embodiments of the invention will now be described with reference to the following drawings in which.

DETAILED DESCRIPTION OF PREFERRED EMBODIMENTS

This invention seeks to provide a method and apparatus for improving the colour rendering of at least a single LED by shifting the dominant wavelength emitted from the LED.

LEDs have been manufactured for many years. The active blue light-emitting materials in LEDs were originally silicon carbide and this had a very low light output. Later, gallium nitride was grown on silicon carbide. The SiC was only the substrate, and the active epitaxial layer was GaN. This greatly improved the light output. More recently, the epitaxial layer has been provided as InGaN and is grown on SiC or sapphire. The blue light output of an InGaN LED is significantly brighter than the previous LEDs. This has allowed new application of blue light-emitting diodes.

Although InGaN LEDs are available in colours of blue, verde, true green and yellow, a white LED is only accomplished through further material such as a phosphor layer or similar.

One of the characteristics of InGaN LEDs is that the wavelength of the light emitted is dependent on the forward current through the device. Although some variation occurs with other materials used to produce LEDs, the dependency is more marked with InGaN LEDs.

In other traditional uses, this variation has been considered somewhat problematic. Generally, a designer of products is looking for a consistent colour and may wish to use the driving current to control emitted intensity. However, as such a control of forward current can not only change the emitted intensity but shift the wavelength of the light produced, such LEDs are normally designed to operate with a relatively stable forward current. For example, the dominant wavelength at a particular design forward current such as 20 mA., may be at 465 nm. If there is a desire to dim the output from the LED, rather than changing the forward current, a pulse width modulated signal is used to reduce the percentage of time that the LED is energized during a particular duty cycle. In this manner, substantially linear variation in the intensity of light produced can be obtained by a substantially linear variation of the percentage of the duty cycle during which the LED is energized without variation in colour.

In this manner, the use of LEDs has generally sought to minimize colour variation. However, if the LED is to be used as a light source for general lighting, whether on its own or in conjunction with other LEDs, at least two dominant wavelengths must appear which can complement each other to provide white light.

Although white light can be produced with a complementary pair of LEDs, even the use of two such LEDs may produce white light although generally with rather poor colour rendering.

Figure 1:
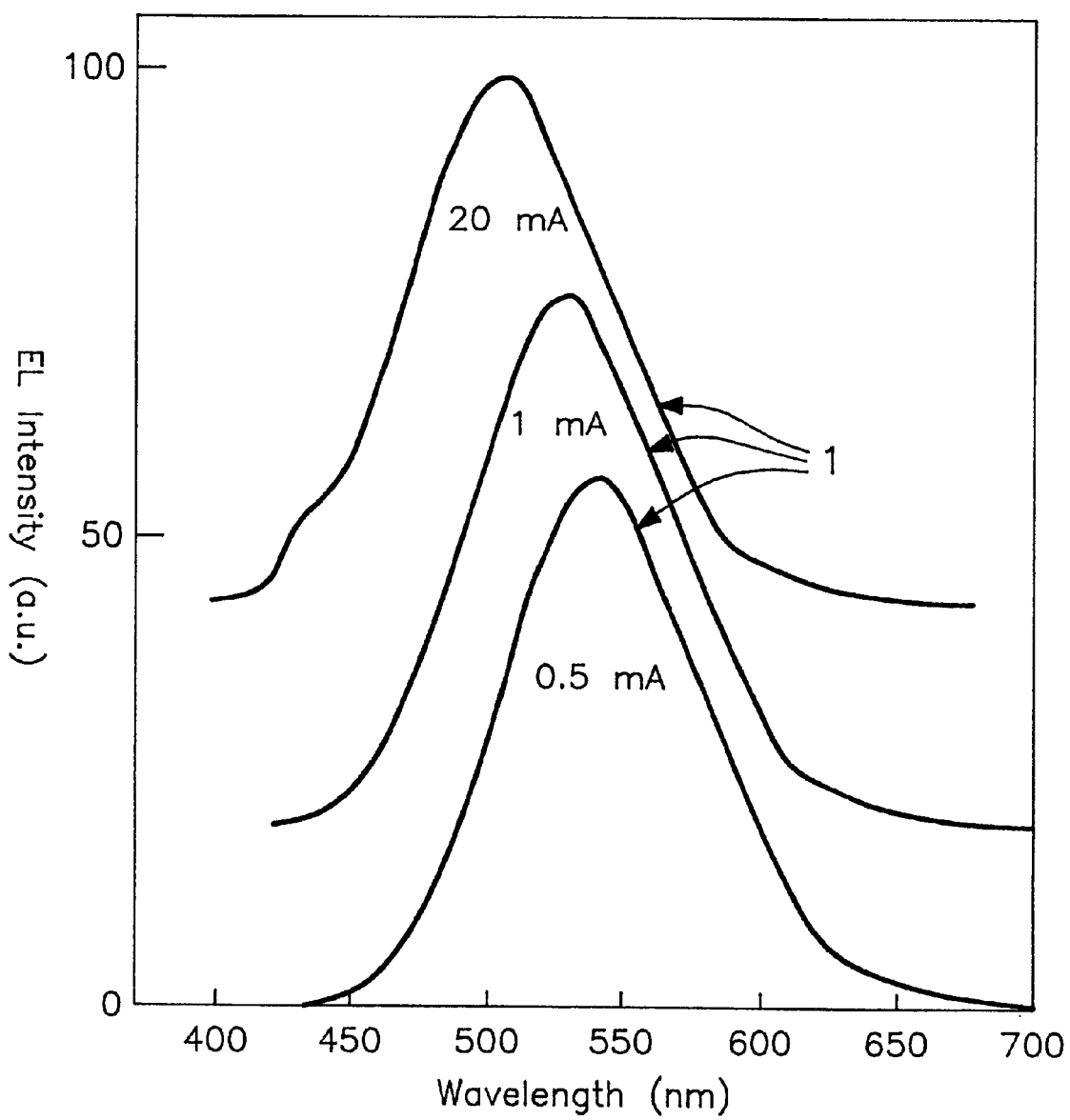
FIG. 1 is a graphical representation of electro luminescent intensity versus dominant wavelength for blue-green LEDs.

Referring to FIG. 1, a typical electro luminescent spectra 1 of InGaN/AlGaN DH blue-green LEDs is shown. Under different forward currents of 0.5, 1 and 20 mA., a change in the dominant wavelength is shown.

Figure 2:
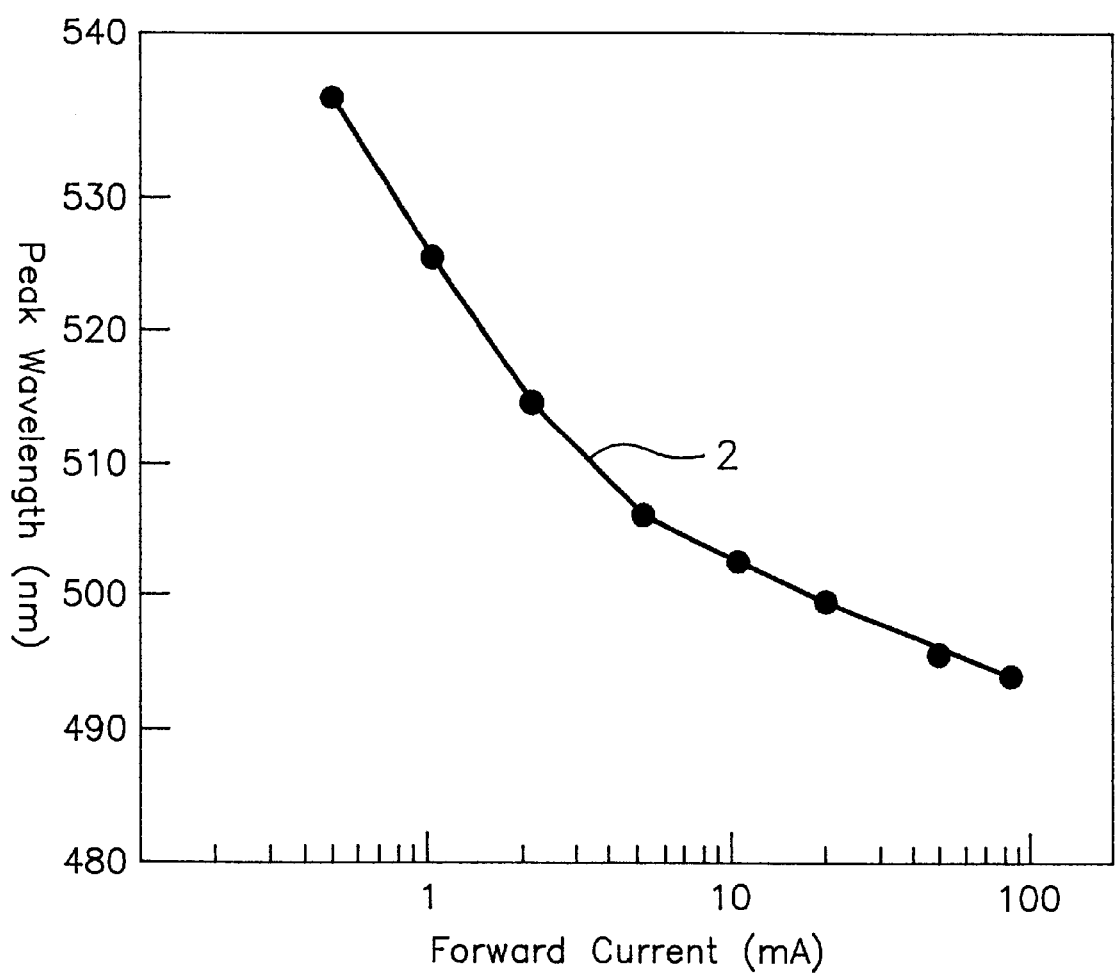
FIG. 2 is a graphical representation of the peak wavelength versus forward current for blue-green LEDs.

Referring to FIG. 2, the peak wavelength 2 of such LEDs at various forward currents is shown. It can be seen that a significant change in wavelength from 535 nm. to 490 nm. can be obtained with changes from 0.5 to 100 mA.

It should be noted that a change in the peak wavelength would also normally change the dominant wavelength and both terms are interchangeable throughout the description. However, as the dominant wavelength refers to the colour perceived by the human eye and it is this perception the invention see to modify dominant wavelength is generally used.

Figure 3A:
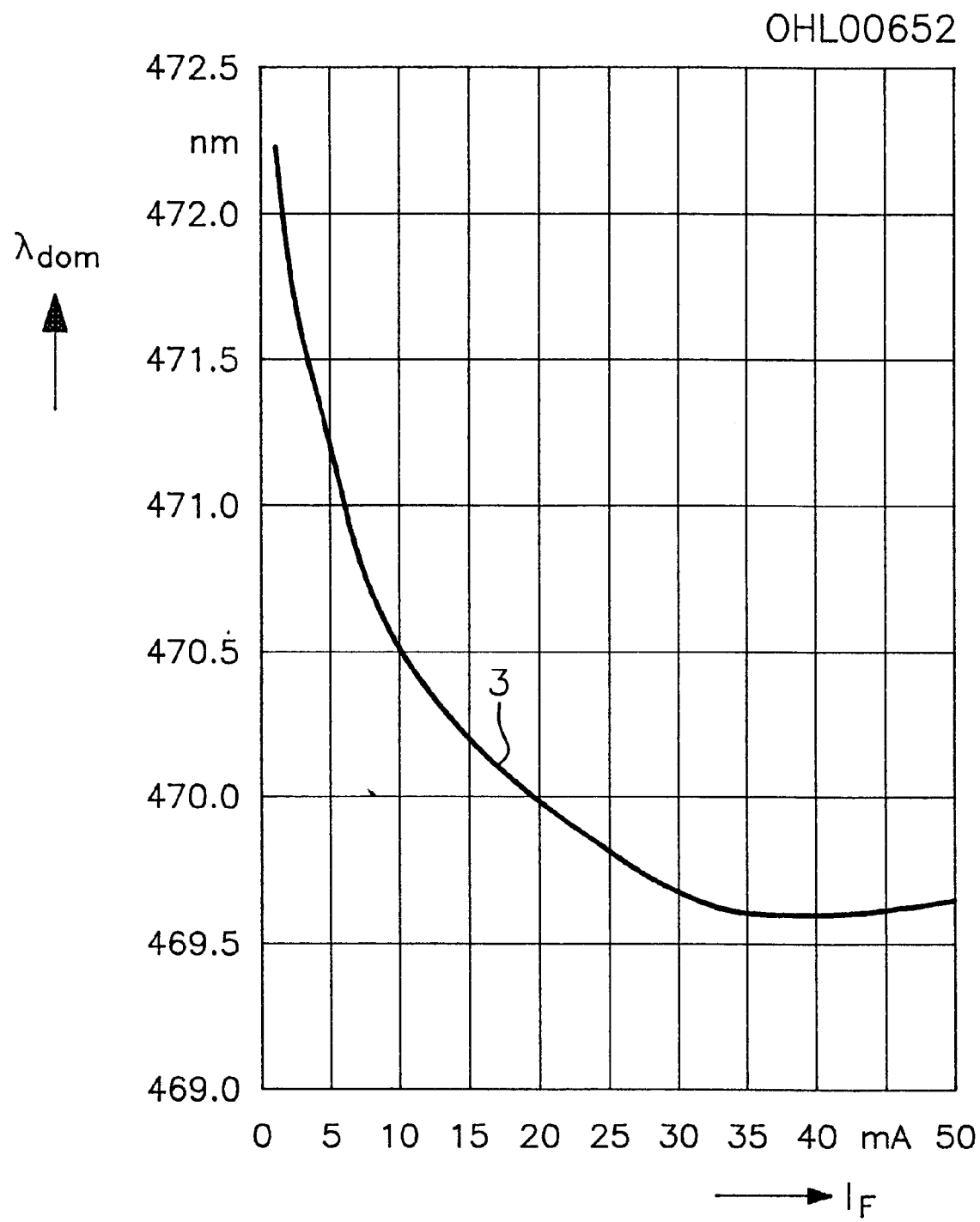
FIGS. 3A, B and C show graphs of dominant wavelengths against forward current for blue, true green and verde LEDs respectively.
Figure 3B:
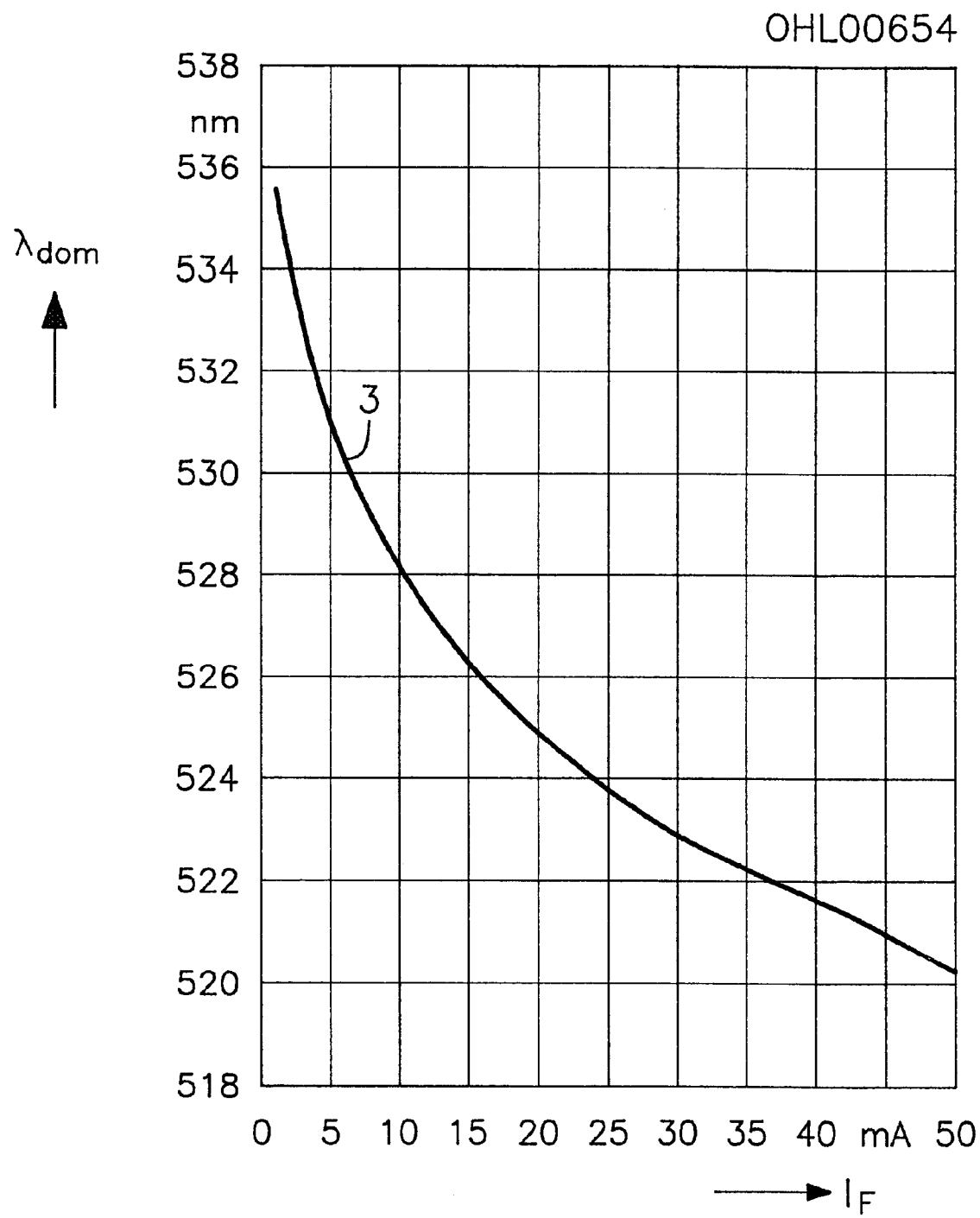
Figure 3C:
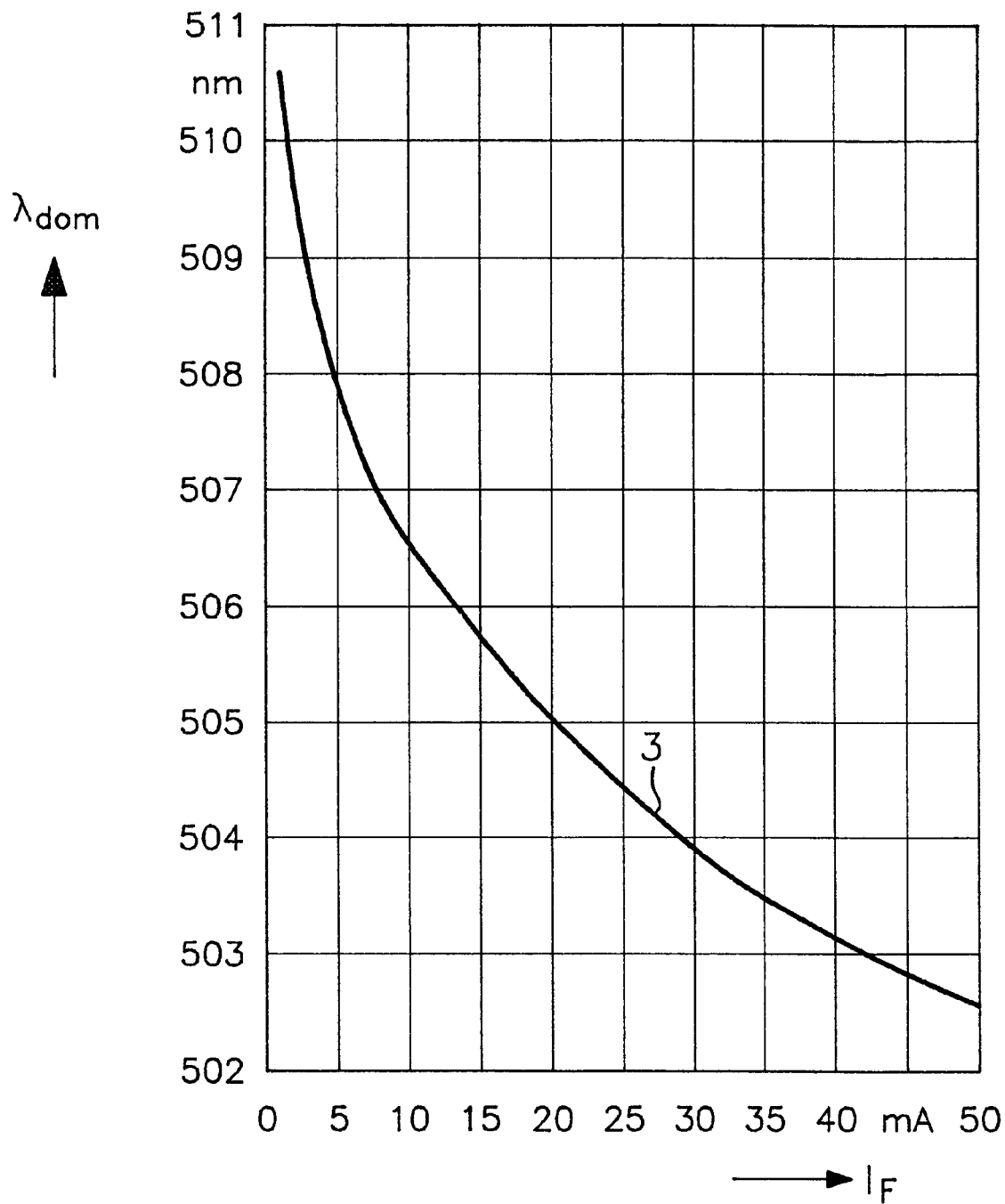

A similar result can be seen for standard commercial InGaN LEDs a shown by plots 3 in FIGS. 3A, B and C. For each of the three commercially available InGaN LED colours, a significant wavelength change is available over moderate changes in forward current.

Figure 4:
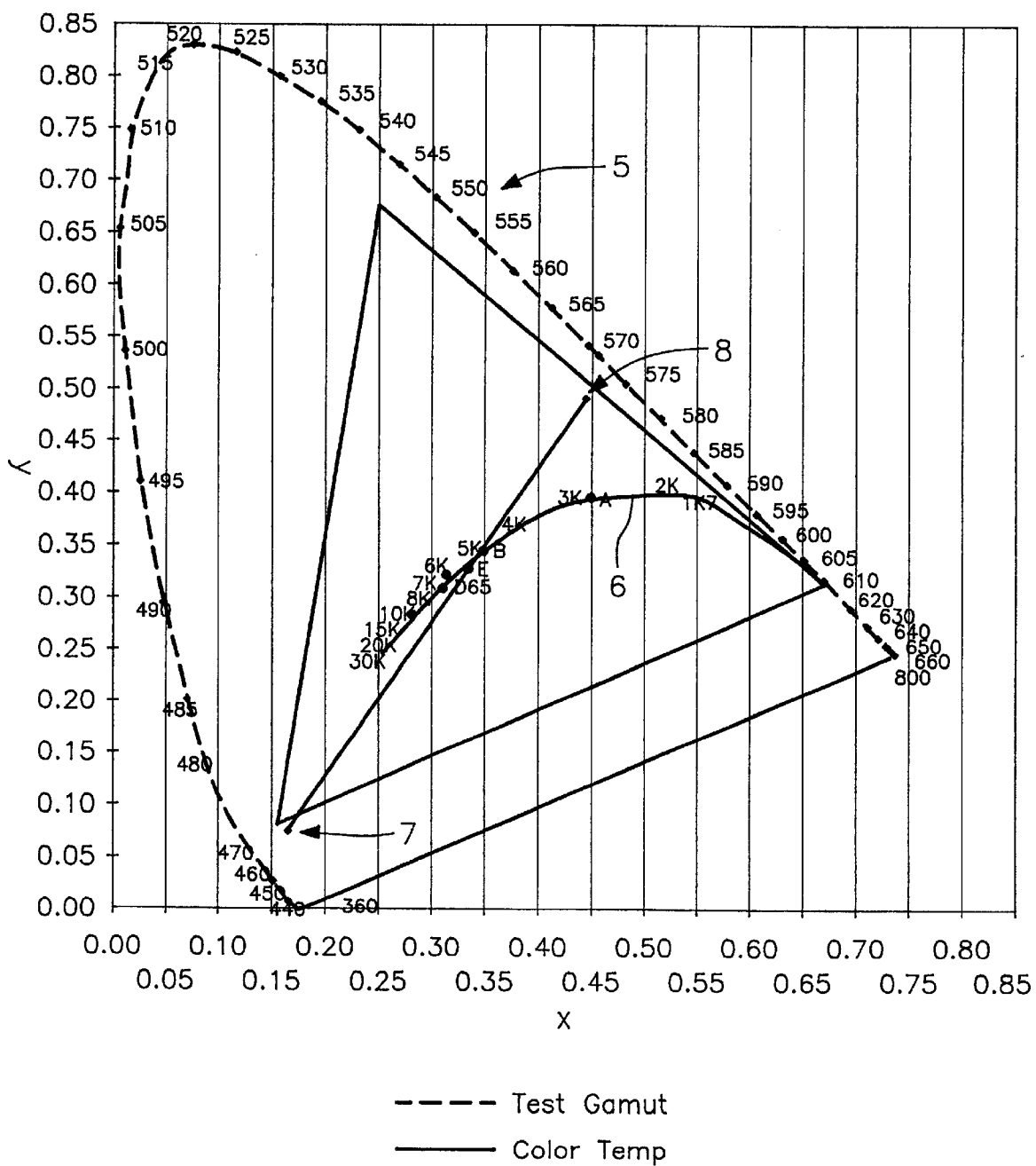
FIG. 4 is a standard chromaticity chart.

Referring to FIG. 4, the standard chromaticity chart is shown. The plot of various frequencies 5 and the colour temperature plot for white light 6 is provided.

As can be seen from this chart, a point on the white light line 6 can be obtained by any one of a variety of complementary pairs of LEDs, generally obtained on opposed sides of the line 6 and between which, a line may pass through the point E. One example is points 7 and 8 on the chart. An LED in the region of point 7 would be emitting a blue colour whereas, in point 8, would be emitting closer to a yellow colour. A variety of different colours may be used to intersect with the line 6 to provide white light.

Regardless of whether the ultimate lamp is to produce white light or other lights, this present invention seeks to broaden the range of dominant wavelengths emitted by the LED to improve the colour rendering index.

Figure 5:
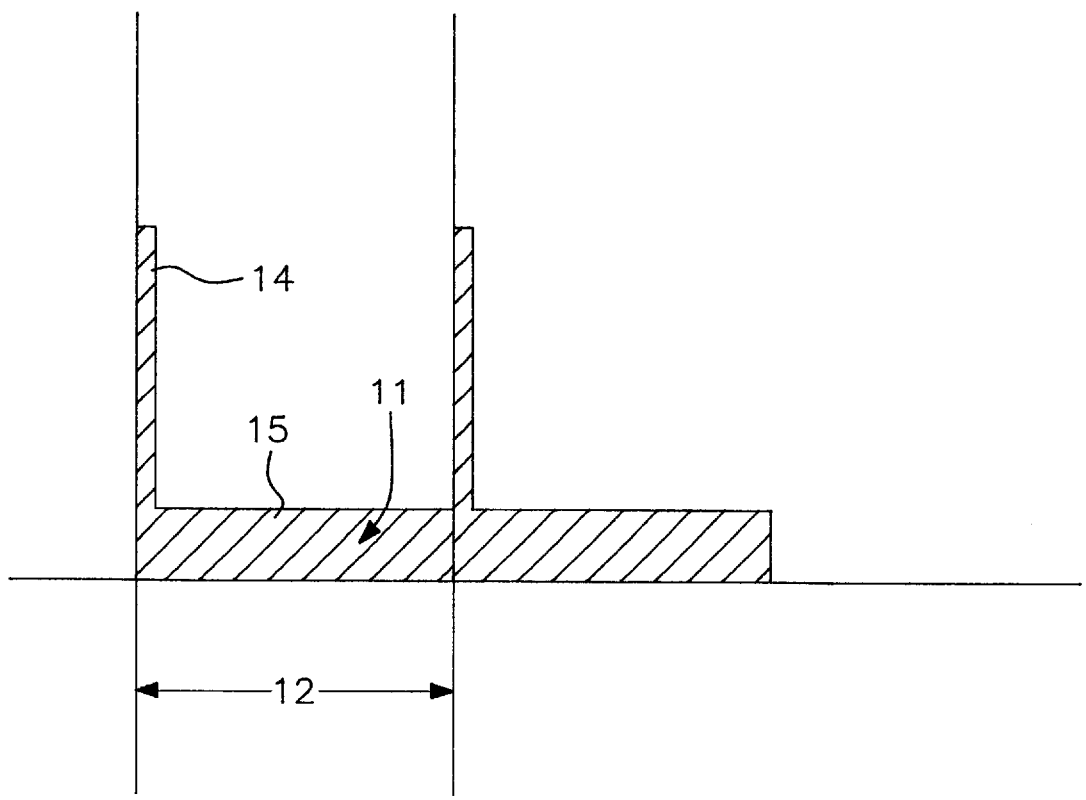
FIG. 5 is a portion of a pulse width modulated signal in accordance with one embodiment of the invention.

Referring to FIG. 5, a possible modulated driving signal 11 is shown. This portion of the signal 11 is over a cycle period 12, after which the signal repeats itself. In this example, the signal comprises a pulse width modulated signal however any variable current driving signal could be used.

Referring to the pulse width modulated signal cycle in FIG. 5, it can be seen that the signal comprises at least two pulses 14 and 15 of different forward current.

As can be seen from this example of a pulse width modulated driving signal, it is likely that the pulse or pulses 14 at higher currents are of substantially shorter duration than the pulse or pulses 15 of lower current. If it is intended to provide an overall light that is an average of these two dolt frequencies, both need to be provided at similar intensities. The intensity of light at each colour is determined by the forward current multiplied by the pulse duration.

The overall effect may not be intended to be a value where the intensity of each colour is exactly matched to each other. There may be a preference towards a greater percentage of one colour than the other to position the overall spectrum of colour produced by the LED.

In driving an LED in this manner, it is intended to provide an observer with an apparently stable colour from the LED even though this colour is made of component parts from each different forward current sent through the LED. To achieve this, the period 12 over which the pulse width modulated cycle occurs must be sufficiently short to eliminate the risk of distinct colours being apparent to an observer. In general, the human eye is unable to distinguish pulses occurring at a frequency much greater than 30 Hz. although even allowing for some considerable margin of error, any signal greater than 60 Hz. in frequency should be sufficient. In effect, the dominant wavelength perceived may be relatively stable. However, throughout the description, the term "dominant wavelength" is intended to relate to the wavelength perceived if the forward current at that instant was held constant to allow an eye to perceive the current colour.

LEDs of the type that may be utilized with this invention also have individual ratings. These ratings relate to the average intensity the LED can bear. A typical value for a commercially available LED may involve a constant forward current of around 20 mA. To maintain the serviceability of the LED, it may be desirable for the pulsed signals 14 and 15 to average out to approximately 20 mA. over the entire duty cycle 12. Therefore, in an example as shown in FIG. 5, different forward currents may be used such as a forward current for the high current pulse 14 of 1 A. and a forward current for the lower current pulse 15 of 5 mA. If such values are used and an LED rated at approximately 20 mA. is driven by this signal, it may be desirable for the 1 A. signal pulse 14 to only be provided for 1.5% of the duty cycle 12 and the 5 mA. pulse for 98.5% of the period 12. This will provide an average forward current for the entire duty cycle of approximately 20 mA.

From FIG. 5, it can be seen that considerable variation in the forward current can be provided and the LED can generally utilize the higher current pulse 14 without significant damage provided the pulse width is kept short. If desired, the high current pulse may be split into a number of pulses spread out through the time period 12. Alternatively, the frequency 12 can simply be increased. Further possibilities include the incorporation of "off" periods during the pulse width modulated signal to vary the overall intensity and also provide the LED with some rest time.

Figure 6:
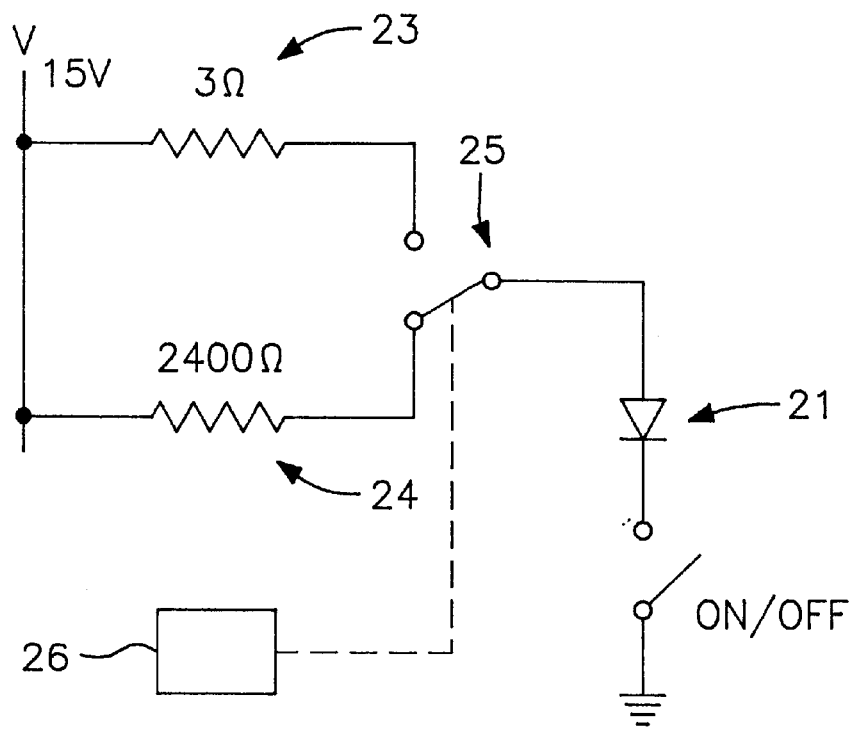
FIG. 6 shows a schematic diagram of a circuit to perform one embodiment of the invention.

Referring to FIG. 6, a possible circuit to implement the invention is shown.

In this driving circuit 20, an LED 21 is driven by the circuit. A current 22 is supplied across alternative resistors 23 and 24 at a set voltage. A switch 25 way be used to simply switch between the resistors 23 and 24 in accordance with a signal from a pulse generator 26. As shown in this particular embodiment, the switch 25 may be biased to the circuit incorporating a higher resistance such as resistors 24. This will create the lower current driving pulse used for the majority of the cycle for driving the LED 21.

Intermittently, a short pulse may be generated by the pulse generator 26 to shift the switch 25 to its alternate position and bring into circuit the lower resistance 23. This lower resistance will create an increase in the driving forward current for the period by which the switch 25 is driven to the alternate position.

In a typical example where the voltage is a, for example, 15 v., a 3-Ohm resistor 23 can be matched with a 24-Ohm resistor 24 to provide the necessary changes in current to dramatically shift the wavelength from the LED 21 at different portions of the driving cycle.

Figure 7:
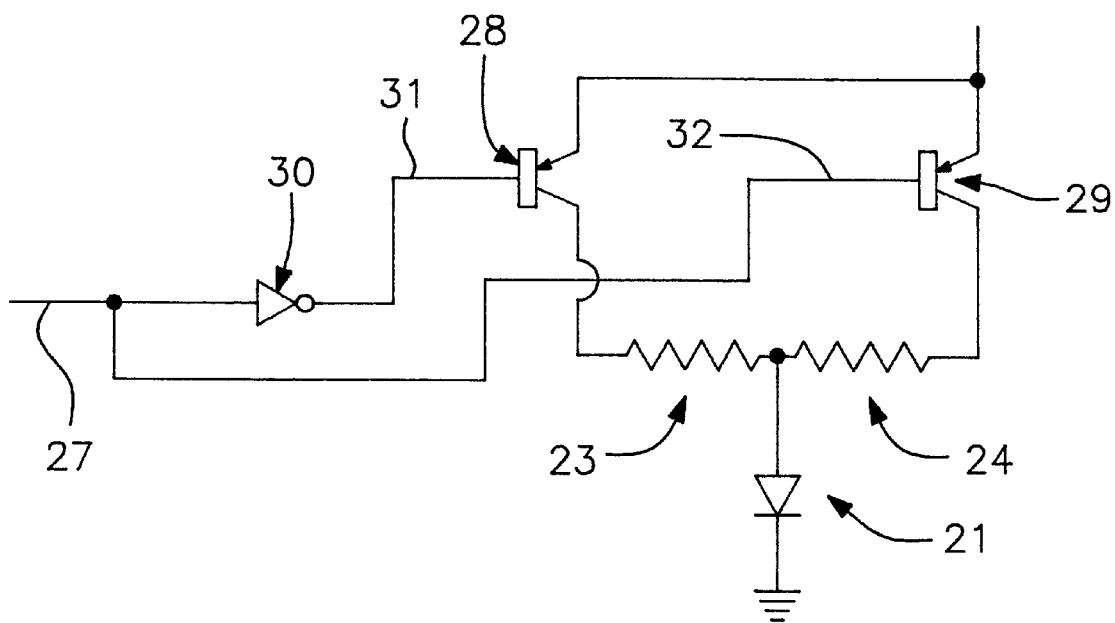
FIG. 7 shows an alternative circuit to implement an embodiment of the invention.

A yet further circuit is shown in FIG. 7.

Again, the LED 21 is alternately placed in circuit with resistors 23 and 24 of different resistance.

A pulse generator (not shown) can produce a pulsed signal along rail 27 towards parallel transistors 28 and 29. Each of these transistors is connected on its output to one of the resistors 23 and 24 respectively.

By placing an inverter 30 in series with one of the transistors, identical transistors can be provided that switch between an open or closed switch according to the state of the incoming paths 31 and 32.

The use of the inverter 30 ensures that only one of the paths 31 or 30 is high at any particular instant and this changes according to the pulsed signal received on rail 27 to switch between the various resistors 23 and 24.

The transistors 28 and 29 can be PNP or NPN transistors or other suitable switches to achieve the same logic.

Thus far, the description has generally dealt with continuous driving of the LED in either a high or low current state with, optionally, a rest period for recovery of the LED. It should also be noted that such light sources can be dimmed through the manipulation of the pulse widths and provided both the high current and low current pulses are reduced in width by similar percentage amounts, some dimming of the emitted light can occur without variation in the colour-mix resulting.

The preferred embodiments described have generally dealt with a driving signal containing only two different currents. Of course, if improved colour rendering is desired over a range of wavelengths, multiple pulses at different currents may be provided through the LED to produce a variety of shifts of emitted wavelength.

Figure 8:
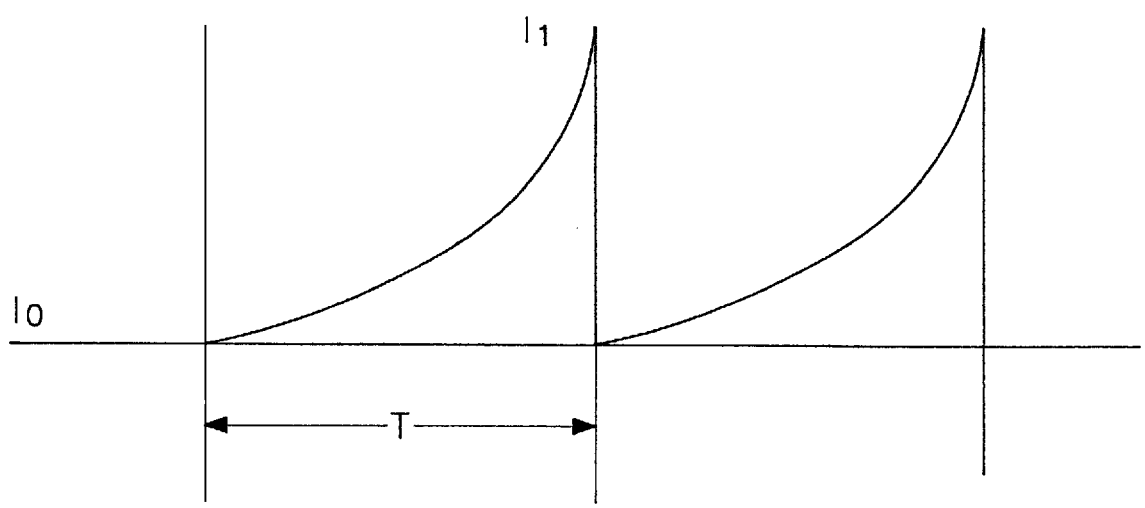
FIG. 8 is a portion of a modulated signal in accordance with a further embodiment of the invention.

Extending the multiple variable pulses to an infinite number of pulses leads to a modulated signal as shown in FIG. 8. In this embodiment the driving current may be a constantly changing analogue signal to provide a full range of wavelengths between the lowest forward current $I_o$ and the highest I. Again, it is preferred that the signal be a non-linear change in I throughout the duty cycle as the highest currents may be required for significantly less time in each cycle than the lower currents.

Hence the LEDs do not need to be restricted to PWM driving signals. Analogue signals can be used or a mix of both with one superimposed on the other.

A variety of complex waveforms may be used. It is intended that the variable current occur sufficiently fast to produce at least two dominant wavelengths within the period of perception of the human eye such as 1/30 seconds or faster.

A repeating cycle at greater than 30 Hz., more preferably 60 Hz. or greater, is used to provide a relatively stable mixed colour than appear constant within and between repeating cycles.

When incorporated into a light, such LEDs may be used with complementary LEDs to provide an overall white light. One or more of the LEDs in the light may be provided with a current variable pulse width modulated signal as described to improve the colour rendering from even white light produced by only two LEDs.

If the current variation and shift in wavelength is taken sufficiently far, white light can be produced from a single LED where the dominant wavelength at each of the driving currents themselves provide at least a complementary pair of colours to produce white light. A combination of blue and yellow can produce such a result To some degree, the current production of LEDs seeks to minimize the shift in wavelength with current variation. Although an LED may be desired for an operating current of, for example, 20 mA., there may be a desire to change this by a few percent to account for degradation of a particular LED. However, to the extent possible, the manufacturers may try and reduce the shift in wavelength as a result of this change in current to provide greater tolerances in the operation and provision of forward current to such LEDs.

The present invention may be better suited to a reversal of this current manufacturing trend to maximize the shift in wavelength upon use of different forward currents. Although the invention is principally intended to operate with InGaN LEDs that exhibit such a shift in dominant wavelength as a result of changes in forward current specialized InGaN LEDs or indeed other LEDs may provide alternative solutions as desired.

Thus it can be seen that the invention provides a method and apparatus for driving an LED to provide a lamp or light source that allows a substantially better colour rendering index of a single LED. Such an LED may be used alone or in conjunction with others to provide an overall light source or lamp.

Although significantly more complicated driving circuits can be provided, the preferred embodiments have been described with relatively simple circuits to allow easy provision of such circuits on a driving circuit for a multitude of such LEDs.

The invention has generally been described in relation to preferred embodiments, however, it will be understood that various modifications may be made without the partying from the spirit and scope of the invention. Specific integers referred to throughout the description are deemed to incorporate known equivalence where appropriate and references to the singular or plural may incorporate the other, also where appropriate. Such variations may become apparent to one skilled in the art upon reading the preceding description.

What is claimed is:

1. A method for improving the colour rendering of a solid state light source comprising:

provoking at least one LED;

providing a current to said LED;

providing a modulated driving signal;

altering the forward current with said modulated driving signal to provide at least two dominant emitted wavelengths from said at least one LED;

wherein said modulated driving signal comprises a pulse width modulated driving signal having at least one pulse at a higher current and at least one further pulse at a lower current; and wherein said at least one pulse at said higher current is of shorter duration than said at least one pulse at said lower current, and said lower current is about 5 mA.

2. The method for improving the colour rendering of a solid state light source as claimed in claim 1, wherein said modulated driving signal includes a repetitious cycle of modulation.

3. The method for improving the colour rendering of a solid state light source as claimed in claim 2, wherein said repetitious cycle is repeated at a frequency faster than the perception of a human eye.

4. The method for improving the colour rendering of a solid state light source as claimed in claim 3, wherein said frequency is greater than or equal to 60 Hz.

5. The method for improving the colour rendering of a solid state light source as claimed in claim 2, wherein said repetitious cycle generates said at least two dominant emitted wavelengths within the cycle period so that only a single substantially constant colour is observed by a human eye.

6. A solid state light source comprising:

at least one LED;

a current signal generator for generating modulated driving signal to said LED;

said modulated driving signal including at least one portion at a higher current and at least one portion of said signal at a lower current within a cycle of said driving signal;

wherein said modulated driving signal is a pulse width modulated driving signal; and wherein said pulse width modulated signal includes at least one pulse of higher current and at least one pulse at a lower current, and said lower current is about 5 mA.

7. The solid state light source as claimed in claim 6, wherein said cycle of said driving signal is a repetitious cycle.

8. The solid state light source as claimed in claim 7, wherein said cycle is at a frequency faster than the perception of a human eye.

9. The solid state light source as claimed in claim 7, wherein said cycle is at a frequency equal to or greater than 60 Hz.

10. The solid state light source as claimed in claim 6, wherein said at least one pulse at said higher current is of shorter duration than said at least one pulse at said lower current.

* * * * *